(12) United States Patent
Gilles et al.

(10) Patent No.: US 6,986,385 B1
(45) Date of Patent: Jan. 17, 2006

(54) HEATING/AIR CONDITIONING INSTALLATION FOR MOTOR VEHICLE INCLUDING MAIN MODULE FORMING FLUID-CARRYING HEAT EXCHANGER

(75) Inventors: Elliot Gilles, Courcouronnes (FR); Ben Fredj Mounir, Montigny-le-Bretonneux (FR)

(73) Assignee: Valeo Climatisation, La Verriere (FR)

( * ) Notice: Subject to any disclaimer, the term of this patent is extended or adjusted under 35 U.S.C. 154(b) by 0 days.

(21) Appl. No.: 09/614,586

(22) Filed: Jul. 12, 2000

(30) Foreign Application Priority Data

Jul. 12, 1999 (FR) .................................. 99 08996

(51) Int. Cl.
*B60H 1/00* (2006.01)
*F28D 7/10* (2006.01)

(52) U.S. Cl. .......................... 165/202; 165/42; 165/43; 165/140; 62/205; 62/243; 62/244; 29/890.03

(58) Field of Classification Search ................. 165/42, 165/43, 202, 140, 163; 62/202, 204, 205, 62/243, 244; 29/890.03, 890.032, 890.035
See application file for complete search history.

(56) References Cited

U.S. PATENT DOCUMENTS

| | | | | |
|---|---|---|---|---|
| 4,651,816 A | * | 3/1987 | Struss et al. ............. | 165/140 X |
| 4,761,967 A | * | 8/1988 | Sumikawa et al. ...... | 165/140 X |
| 4,949,779 A | * | 8/1990 | Kenny et al. ............. | 165/42 X |
| 4,976,309 A | * | 12/1990 | Åverin ........................ | 165/42 |
| 5,000,257 A | * | 3/1991 | Shinmura ................... | 165/140 |
| 5,009,262 A | * | 4/1991 | Halstead et al. ............ | 165/140 |
| 5,080,167 A | * | 1/1992 | Wolf .......................... | 165/140 |
| 5,129,144 A | | 7/1992 | Halstead et al. ....... | 29/890.035 |
| 5,186,246 A | * | 2/1993 | Halstead ..................... | 165/140 |
| 5,366,005 A | * | 11/1994 | Kadle ......................... | 165/140 |
| 5,408,843 A | * | 4/1995 | Lukas et al. ................. | 62/244 |
| 5,526,650 A | * | 6/1996 | Iritani et al. ................. | 62/205 |
| 5,725,048 A | * | 3/1998 | Burk et al. .................. | 165/42 |
| 5,884,696 A | * | 3/1999 | Loup ........................ | 165/43 X |
| 5,898,995 A | | 5/1999 | Ghodbane ................ | 29/890.03 |
| 6,173,766 B1 | * | 1/2001 | Nakamura et al. ...... | 165/140 X |
| 6,209,628 B1 | | 4/2001 | Sugimoto et al. .......... | 165/140 |
| 6,213,196 B1 | * | 4/2001 | Ozaki et al. ................ | 165/140 |
| 6,230,793 B1 | * | 5/2001 | Sumida ...................... | 165/140 |
| 6,405,793 B1 | * | 6/2002 | Ghodbane et al. ........ | 62/244 X |
| 6,491,090 B1 | * | 12/2002 | Frugier et al. ................ | 165/43 |

FOREIGN PATENT DOCUMENTS

| | | | | |
|---|---|---|---|---|
| DE | 28 31 022 A1 | * | 1/1980 | |
| EP | 0 289 406 A1 | * | 11/1988 | |
| EP | 0888912 | | 1/1999 | |
| FR | 2761405 | | 10/1998 | |
| GB | 2 270 375 A | * | 3/1994 | |
| JP | 57-2980 | * | 1/1982 | |
| JP | 61-49992 | * | 3/1986 | |
| JP | 2001-191786 A | * | 7/2001 | |

* cited by examiner

*Primary Examiner*—Ljiljana Ciric
(74) *Attorney, Agent, or Firm*—Berenato, White, Stavish

(57) ABSTRACT

A heating/air-conditioning installation for a motor vehicle has a thermal loop which includes a refrigerating compressor, a gas cooler, a pressure-reducing valve, an evaporator, and a heating element. The gas cooler and the heating element are grouped together into a single exchanger including a main module forming a main fluid-carrying heat exchanger.

19 Claims, 5 Drawing Sheets

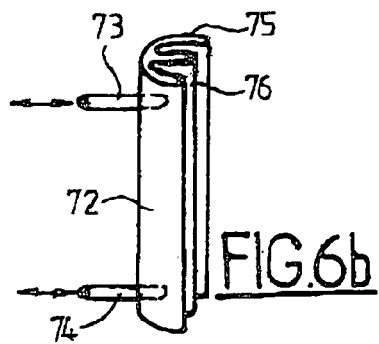
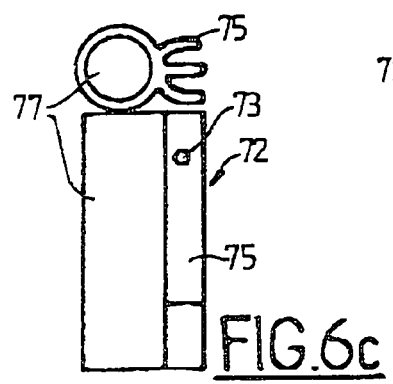
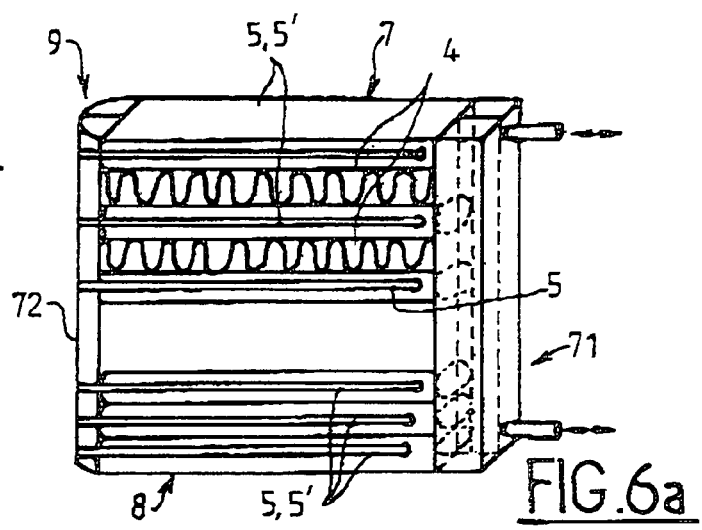
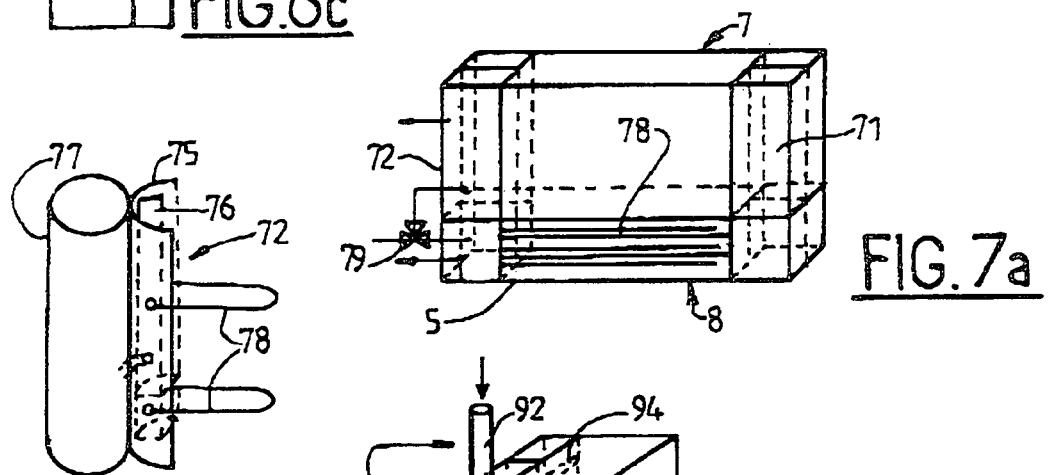
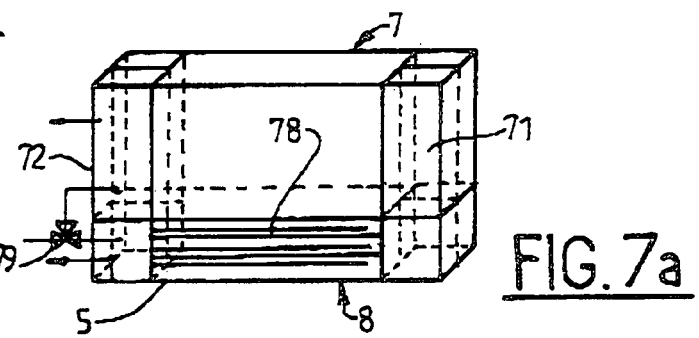
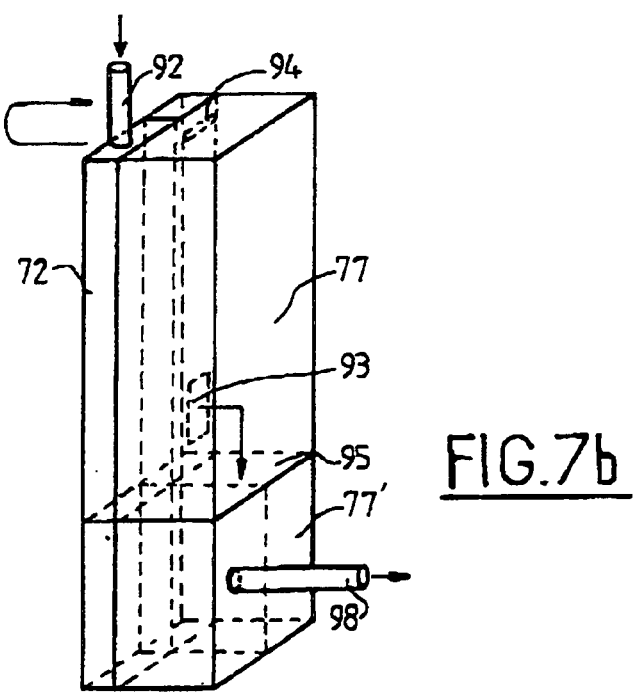

HEATING/AIR CONDITIONING INSTALLATION FOR MOTOR VEHICLE INCLUDING MAIN MODULE FORMING FLUID-CARRYING HEAT EXCHANGER

FIELD OF THE INVENTION

The subject of the present invention is a heating/air-conditioning installation for a motor vehicle, comprising, on the one hand, a thermal loop which includes a refrigerating compressor, a condenser, a pressure-reducing valve and an evaporator and, on the other hand, a heating element.

BACKGROUND OF THE INVENTION

In known installations, it is known to use an air/refrigerant-fluid exchanger within a heating and air-conditioning apparatus to heat the passenger compartment via the condensation of hot gases leaving a compressor, for example by employing a heat pump. This implies the use of an external exchanger in order for the air conditioning to operate. This is because the disposal of the heat energy into the surroundings always takes place by the use of an air/refrigerant fluid exchanger which is located outside the passenger compartment, or by passing through an intermediate fluid such as water. In this latter case, a first loop makes it possible to take up the heat energy in a water/refrigerant-fluid exchanger, and subsequently a second loop allows this same heat energy to be disposed of into the surroundings by means of an air/water exchanger.

It is also known to use a water/refrigerant fluid exchanger as a condenser as described in the French Patent Application No. FR 2 761 405 filed on 27 Mar. 1997 by the Applicant. This embodiment, which gives flexibility of location of this exchanger, needs overcooled water to be available, having a temperature close to 55° C., in order to be able to condense the refrigerant fluid correctly at acceptable levels of pressure and of energy consumption. In these embodiments, the exchanger is placed outside the passenger compartment and, obviously, outside the airconditioning apparatus.

Moreover, all the solutions described above exhibit the drawback of making use of a heating element (heating radiator) which operates only in cold weather or in order to de-humidify, and a condenser which operates only in hot weather or in order to dehumidify.

The basic idea of the present invention is to group together the heating element and the condenser into a single element which will operate in both modes.

SUMMARY OF THE INVENTION

According to the present invention there is provided a heating/air-conditioning installation for a motor vehicle, comprising, on the one hand, a thermal loop in which a refrigerant fluid flows and which includes a refrigerating compressor, a gas cooler, especially a condenser, a pressure-reducing valve and an evaporator, and, on the other hand, a heating element, wherein the gas cooler and the heating element are grouped together into a single exchanger including a main module forming a main air/heat-carrying fluid/refrigerant-fluid exchanger.

The heat-carrying fluid may be hot water, for example the cooling water from the engine, or else be overcooled water or even demineralized water of a fuelcell loop.

The invention particularly makes it possible to bring together, in regards to relative position, the gas cooler, especially a condenser, and the evaporator, which is beneficial in terms of the cost of pipework. Moreover, the invention makes it possible to reduce the number of connections through the bulkhead or to group together all these connections which are sources of possible leaks of refrigerant fluid.

The main exchanger advantageously exhibits:

The main exchanger may consist of a stack of modules, each of which includes:

- at least one surface providing an interface between the air and the heat-carrying fluid flowing through the main exchanger and/or at least one surface providing an interface between the air and the refrigerant fluid flowing through the main exchanger, and
- at least one surface providing an interface between the heat-carrying fluid and the refrigerant fluid of the thermal loop flowing through the main exchanger.
- an element for exchanging between the heat-carrying fluid and the refrigerant fluid of the thermal loop, having at least one surface in thermal contact with an element for interfacing with the air; and
- the element for exchanging or interfacing with the air.

According to a first preferred variant, the element providing an interface between the heat-carrying fluid and the refrigerant fluid successively exhibits:

- a first heat-carrying fluid circulation element;
- a refrigerant-fluid circulation element having a first surface in thermal contact with a first surface of the first heat-carrying fluid circulation element, and a second surface in contact with a first surface of a second heat-carrying fluid circulation element, and
- the second heat-carrying fluid circulation element, and in which the element for exchanging and interfacing with the air exhibits a first surface for interfacing with a second surface of the second heat-carrying fluid circulation and in which the element interfacing with the air exhibits a first surface for interfacing with a second surface of the second heat-carrying fluid circulation element and a second surface for interfacing with a second surface of the first heat-carrying fluid circulation element of an adjacent module.

The element providing an interface between the heat-carrying fluid and the refrigerant fluid may successively exhibit: a third heat-carrying fluid circulation element having a first surface in thermal contact with a second refrigerant-fluid circulation element of the thermal loop; and the second refrigerant-fluid circulation element. In that way, the main exchanger exhibits surfaces for exchanging between the air and the heat-carrying fluid, between the air and the refrigerant fluid and between the heat-carrying fluid and the refrigerant fluid.

The main exchanger may include a collector of the heat-carrying fluid and a collector of refrigerant fluid of the thermal loop which are arranged at opposite ends of the exchanger.

The element providing an interface between the heat-carrying fluid and the refrigerant fluid of the thermal loop may exhibit at least one heat-carrying fluid circuit element for making the heat-carrying fluid circulate along an outwards and return path from and to the heat-carrying fluid collector and at least one refrigerant-fluid circuit element for making the refrigerant fluid of the thermal loop circulate, preferably at least partly counter to the flow of the heat-carrying fluid, along an outwards and return path from and to the refrigerant-fluid collector.

According to a preferred variant, the exchanger includes an auxiliary module forming an auxiliary exchanger of the heat-carrying fluid/refrigerant fluid which is traversed by the refrigerant fluid of the main loop and by the heatcarrying fluid, for example the engine cooling water, and which is intended to serve as a sub-cooling exchanger for the refrigerant fluid of the main loop and/or as evaporator for a heat pump.

The auxiliary module may include a stack of heat-carrying fluid/refrigerant fluid exchange modules.

The thermal loop may exhibit a first routing circuit in order, in heating mode, to form a heat pump the condenser of which is the main exchanger and the evaporator of which is the auxiliary exchanger.

According to another variant, the thermal loop exhibits an additional evaporator for operation in heating mode, and a second routing circuit in order, in heating mode, to form a heat pump the condenser of which is the main exchanger and the evaporator of which is an additional evaporator.

The thermal loop may exhibit a third routing circuit in order, in a thermal heating mode, to form a heating loop and including the compressor and the main exchanger and the auxiliary exchanger as appropriate, the refrigerant-fluid outlet of the main exchanger being coupled to the inlet of the compressor, either directly or via a pressure-reducing valve. This pressure-reducing valve can be arranged downstream of the main exchanger, which enhances the thermal exchanges, since the refrigerant fluid in the gaseous state is hotter.

The heating loop may exhibit a pressure-reducing valve arranged before or after the main exchanger, which makes it possible to work with a lower-density fluid, which enhances the efficiency, and at lower speed, and thus with lower noise. In the mode of heating via the refrigerant fluid, the circulation of heat-carrying fluid (especially of water) can be allowed or prevented on the basis of the temperature discrepancies between the two fluids and of the overall throughput of the system.

The thermal loop may include a supply device for supplying the main exchanger, either with cooling water, for example from the motor of a fuel cell or from a battery system, or with overcooled water.

The installation may then exhibit:
an air-conditioning mode in which the main exchanger is traversed by refrigerant fluid and by overcooled water, and
a heating mode in which the main exchanger is traversed by the cooling water from the vehicle engine.

The installation may exhibit a mixing flap which, in the air-conditioning mode, is in a closed position in which the main exchanger is isolated from the airflow.

The installation may then equally exhibit a demisting mode in which the air-conditioning mode is activated, and in which the mixing flap is in an at least partially open position, so that the main exchanger is traversed by at least a part of the airflow.

The installation may exhibit a preassembled module including the exchanger, the evaporator, at least one air duct, as well as air mixing and/or distribution means.

The preassembled module may include the refrigerating compressor and/or the pressure-reducing valve, and/or an electric pump and/or a bottle of refrigerant fluid.

The preassembled module may equally include a structural element of the vehicle and/or a steering column and/or an inflatable bag and/or a pedal assembly and/or a motor of the drive members for the windscreen wipers of the vehicle, and/or a water separator for an air intake into the passenger compartment, and/or at least one air-cleaner filter housing and/or at least one display element.

The preassembled module may exhibit the thermal loop which is assembled especially by welding or brazing, in a leaktight manner.

The preassembied module may include a part of the structure of the vehicle, for example a part of the bulkhead and/or the bay lower crosspiece.

BRIEF DESCRIPTION OF THE DRAWINGS

Other characteristics and advantages of the invention will emerge better on reading the description which will follow, given by way of non-limiting example, in connection with the drawings in which:

FIG. 2a illustrates another variant of an exchanger according to the invention, FIG. 2b being a cross section of an element for exchanging between the water and the refrigerant liquid of FIG. 2a;

FIG. 3a represents a thermal loop implementing the invention, and of which

FIG. 6a represents, in perspective, an exchanger according to the invention which includes the main module forming a main exchanger, as well as an auxiliary module forming an auxiliary exchanger;

FIG. 6b represents a refrigerant-fluid collector corresponding to FIG. 6a, FIGS. 6c and 6d illustrate a preferred variant of this collector, which incorporates a bottle of refrigerant fluid;

FIG. 7a represents a variant of the exchanger of FIG. 6a, and FIG. 7d represents the refrigerant-fluid collector of the Exchanger of FIG. 7a.

DESCRIPTION OF THE PREFERRED EMBODIMENTS

The invention applies more particularly to heating/air-conditioning apparatus which exhibits a mixing flap on the air.

The basic idea of the present invention is thus to use a heat-carrying fluid/air/refrigerant-fluid exchanger which fulfils respectively the roles of gas cooler or of radiator on the basis of the operating modes chosen. In the case of a "conventional" thermal loop, the gaseous refrigerant fluid is condensed in the gas cooler which constitutes a condenser. In the case of a thermal loop operating in what is known as "supercritical" mode, the gaseous refrigerant fluid, for example $CO_2$, is simply cooled in the gas cooler.

The rest of the invention relates, in a nonlimiting way, to the case of a conventional thermal loop, which employs a condenser and in which the heat-carrying fluid is water.

Figure 1A:
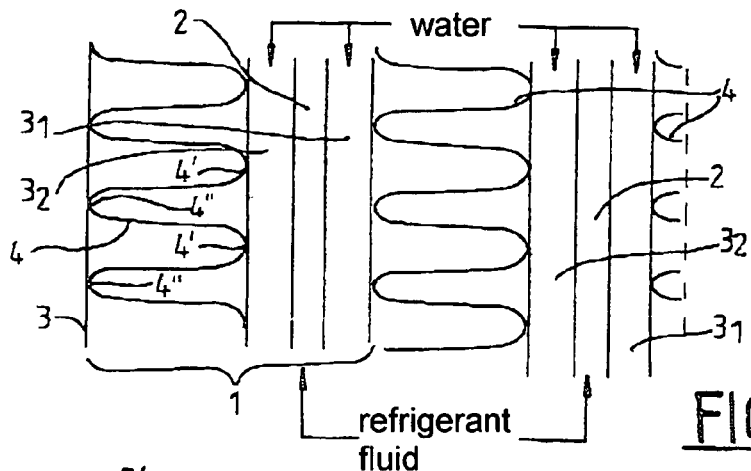
FIGS. 1a to 1d illustrate a preferred embodiment of the exchanger according to the invention, FIG. 1a being a diagrammatic representation of the exchanger, FIG. 1b being a perspective view of an element for exchanging between the water and the refrigerant liquid, FIGS. 1c and 1d being partial sections of FIG. 1b.

The first embodiment described in FIGS. 1a to 1d makes it possible to give maximum preference to the exchange between water tubes and refrigerant-fluid tubes. As FIG. 1a shows, a refrigerant-fluid circulation element referenced 2 is arranged between two water-circulation elements referenced $3_1$ and $3_2$, with each of which it exhibits a thermal-exchange surface 26 and 27.

Figure 1B:
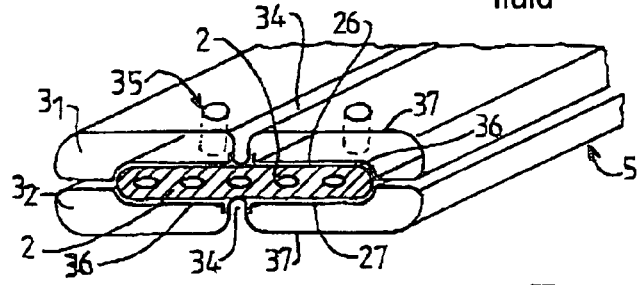

The exchanger consists of a stack of modules successively comprising the element $3_1$, the element 2, the element $3_2$, and an element 4 for exchanging thermal energy with the air, known in the art as a heat dissipating fin, which is generally formed from thin corrugated foil. The modules 1 are superimposed in such a way that the elements 4 have a surface for exchanging, on the one side 4', with the element $3_2$ of a module 1, and, on the other side 4", with the element $3_1$ of the adjacent module 1. This structure particularly favors the exchanges between the water and the refrigerant fluid, all the more so since, as FIG. 1b shows, the elements $3_1$ and $3_2$ can be assembled in such a way as to surround the element 2 which is traversed by the refrigerant fluid. Moreover, and for a better thermal exchange, the circulation of the water and of the refrigerant fluid takes place along a U-shaped outwards and return path from a water collector 11 arranged at one end of the exchanger and from a refrigerant-fluid collector 12 arranged at the other end thereof. Moreover, the respective U-shaped paths are preferably arranged in such a way that the fluid currents (water and refrigerant fluid) circulate as far as possible counter to each other.

It also comes under the scope of the present invention to promote the air/refrigerant-fluid exchange. In this configuration, the main exchanger consists of a stack of modules exhibiting surfaces for exchanging or interfacing, on the one hand, between the air and the refrigerant fluid, and, on the other hand, between the heat-carrying fluid and the refrigerant fluid.

Figure 2B:
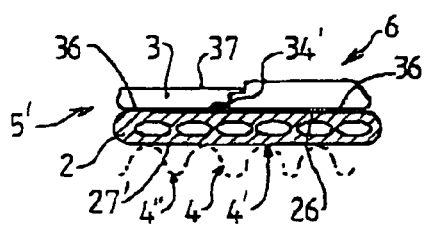
Figure 2A:
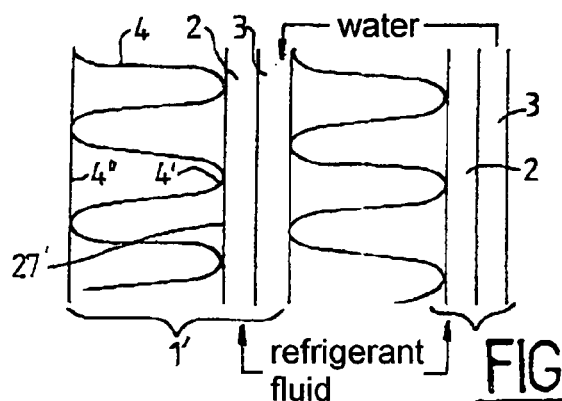

FIG. 2a illustrates another variant of the exchanger according to the invention, according to which it is produced as a stack of modules 1' each of which includes a water-circulation element referenced 3, a refrigerant-fluid circulation element referenced 2, and an element for exchanging with the air referenced 4. In this embodiment, the cooling-fluid circulation element 2 exhibits an exchanging surface 27' in thermal contact with an exchanging surface 4' of the element 4 for exchanging with the air, the other exchanging surface 4" of which is in thermal contact with the surface 37 of the element 3 of an adjacent module 1'.

Figure 1C:
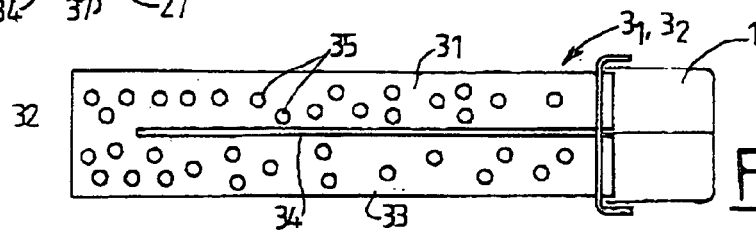
Figure 1D:
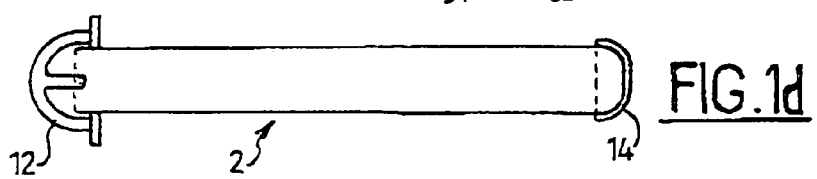

The water-circulation elements 3, $3_1$ and $3_2$, exhibit circulation channels forming a U delimited, for example, by a central groove 34 in the case of FIG. 1c or else by complementary shapes 34' in the case of FIG. 2b. Moreover, turbulation elements 35 can be arranged in such a way as to make the water flow turbulent. As FIG. 1c shows, the water first of all travels a straight-line outward trajectory 31 then turns at 32 and comes back to the collector 11 via the straight-line return path 33. The elements 3, $3_1$, $3_2$ exhibit surfaces 36 for exchanging with a surface 26 or 27 of an element 2 and surfaces 37 for exchanging with exchanging surfaces 4', 4" of an element 4 for exchanging with the air.

In the case of FIG. 1b, the element 2 exhibits a surface 26 for exchanging with the element $3_1$, and a surface 27 for exchanging with the element $3_2$. In the case of FIG. 2b, the element 2 exhibits a surface 26 for exchanging with the element 3, and a surface 27' for exchanging with the element 4. In both of these cases, it is advantageous for the water to be driven by an electric circulation pump.

Figure 3A:
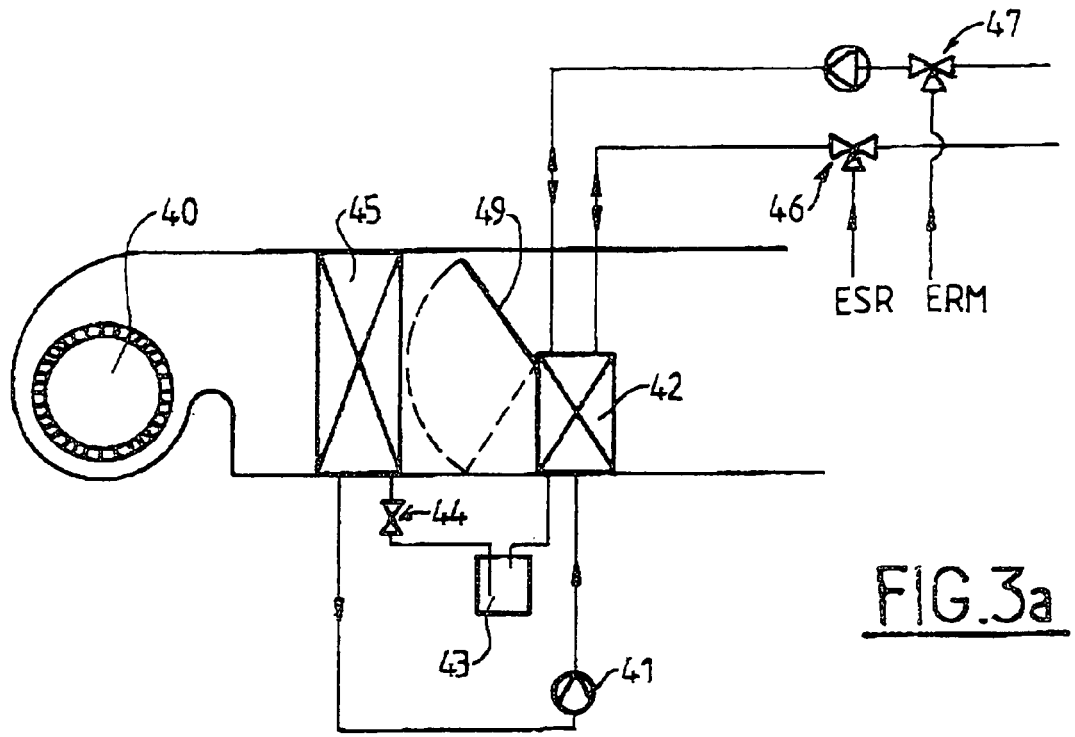
Figure 3B:
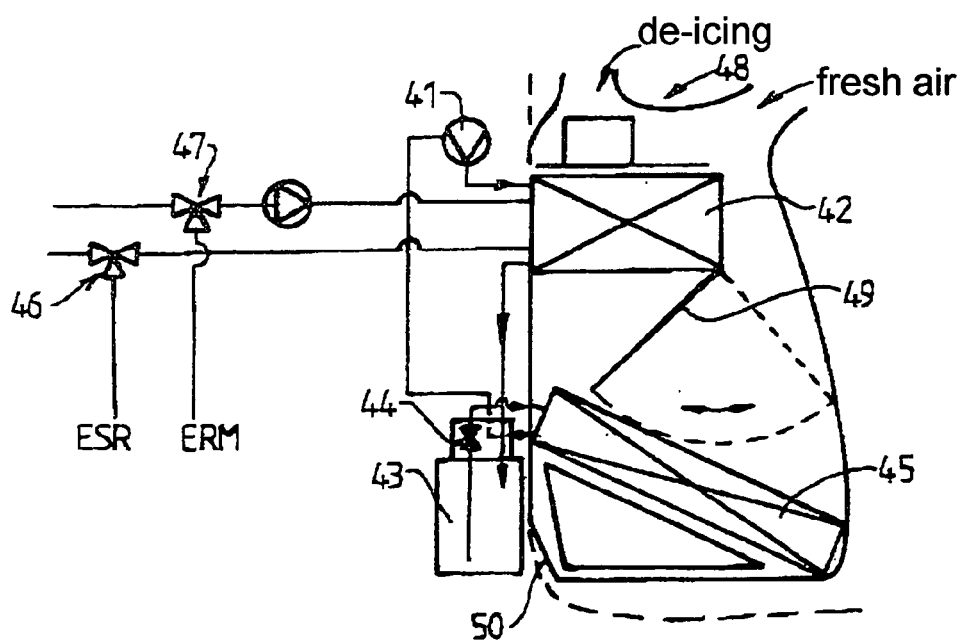
FIG. 3b represents an example of installation into a vehicle.

As FIGS. 3a and 3b show, a device according to the invention includes a blower 40, and a thermal loop consisting of a compressor 41, preferably an electric compressor, an exchanger 42 which is an air/water/refrigerant-fluid exchanger such as described, for example, in the preceding figures, a bottle 43 of refrigerant fluid, a pressure-reducing valve 44 and an evaporator 45 the outlet of which feeds the inlet of the compressor 41 so as to close the loop.

The installation also includes a mixing flap 49 which, depending on the position at which it is placed, allows or does not allow the exchanger 42 to be isolated from the airflow generated by the blower and which passes through the evaporator 45 (especially to carry out a de-misting function).

Moreover, the exchanger 42 is fed via two threeway valves 46 and 47, which make it possible to have its water circuit traversed either by the overcooled water ESR, or by the cooling water ERM, for example cooling water from the internal-combustion engine of the vehicle.

FIG. 3b shows the layout of the installation in which the exchanger 42 and the evaporator 45, the blower 40 and the flap 49 are arranged within the passenger compartment so as to feed outlets, for example for de-icing or freshair ventilation, whereas, in the engine compartment and on the other side of the bulkhead 50, are arranged the compressor 41, the bottle 43 and the pressure-reducing valve 44, as well as the three-way valves 46 and 47.

Under these conditions, the heating/airconditioning installation exhibits, on the one hand, in the passenger compartment, a heating/air-conditioning apparatus combining air outlets and inlets, a system of control flaps including the flap 49, the blower 40, the evaporator 45 and the exchanger 42, and, on the other hand, in the engine compartment, the above mentioned elements referenced 41, 43, 44, 46 and 47.

It is seen that this layout, even if it means a certain number of connections through the bulkhead, allows for short links since the combination of these components can be arranged in proximity to the bulkhead 50 and on either side of it.

The operation of this installation is as follows:

In the air-conditioning mode, the mixing flap 49 is closed (position represented in FIG. 3b) and the exchanger 42 is isolated from the airflow. The exchanger 42 is traversed both by the hot refrigerant which is leaving the compressor 41 and by the overcooled water ESR directed by the valve 46. The heat energy absorbed by the evaporator 45 is in that way disposed of to the outside by virtue of the overcooled water ESR which passes through the exchanger 42.

In the heating mode, the air conditioning is stopped and the exchanger 42 operates as a radiator which is traversed by the cooling water ERM from the internal combustion engine of the vehicle.

In the de-misting mode, the air conditioning is turned on and the mixing flap 49 is in the open position represented in FIG. 3a. If it is desired that the de-misting operation be accompanied by cooling, the flap 49 is partially open. If the operation is accompanied by a desired heating-up, it is possible to make hot water circulate through the exchanger 42, for example the cooling water from the engine ERM instead of the overcooled water ESR, which somewhat degrades the operation of the air conditioning and makes it possible to stabilize the system which is generally unstable at low thermal load.

The bottle 43 can be placed either in the passenger compartment or else, as represented, in the engine compartment. It may also carry the pressurereducing valve 44 (as represented in FIG. 3b) in such a way that the assembly forms only one single module.

The compressor 41 is preferably an electric compressor, which makes it possible to dissociate the drive of the compressor from the rotational speed of the internal-combustion engine. In that way it becomes possible to arrange the compressor close to the bulkhead 50 in the engine compartment, or even in the passenger compartment itself.

It is thus possible to produce a very compact loop in which the lengths of the pipework are very short and which is physically very close to the heating and air-conditioning apparatus proper which includes all the air ducts, flaps, etc. It then becomes possible to produce the entire loop in a single module which can form part of a "cockpit" module integrating at least the heating and air-conditioning apparatus. This module may particularly integrate heat exchangers, air ducts and mixing and distribution means which form part of a conventional air-conditioning apparatus, as well as housings suitable for accommodating a refrigerating compressor and/or an electric pump and/or a bottle of refrigerant fluid and/or a pressure-reducing valve and/or a structural element and/or a steering column and/or several inflatable bags and/or a pedal assembly. This module may constitute a subassembly which is preassembled outside the main motor-vehicle assembly line and which is mounted directly as a whole. In that way, this loop can be made completely hermetic, particularly by virtue of its welded joints. This makes it possible to produce a system exhibiting no leaks of refrigerant.

This subassembly can also include the motor and/or the members for driving the windscreen wipers, as well as the water separator for the air intake into the passenger compartment and/or at least one housing able to accommodate an air-cleaner filter.

The module may also include the power electronics which manage the compressor and/or the electric pump and/or an alternator/starter. These electronic components can be grouped together into a single module cooled by the same means, particularly the water overcooled to 550C.

Figure 4:
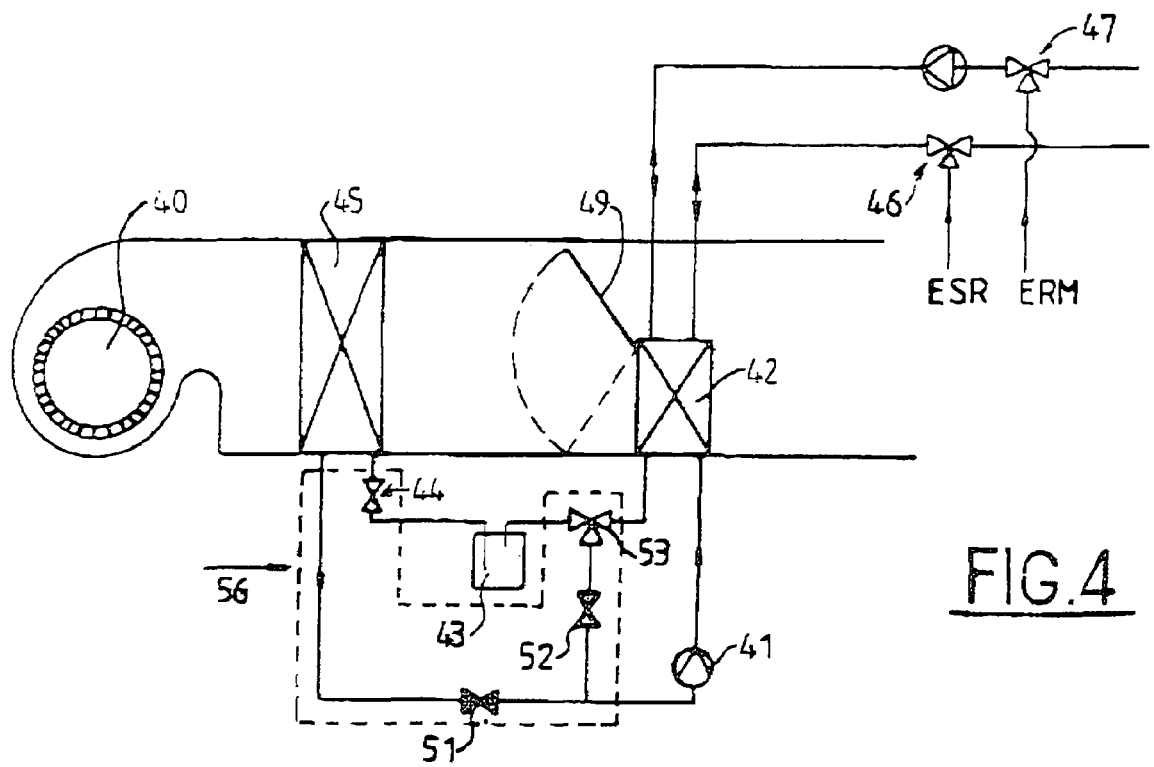
FIGS. 4 and 5 represent two thermal loops according to the invention employing additional heating.
Figure 5:
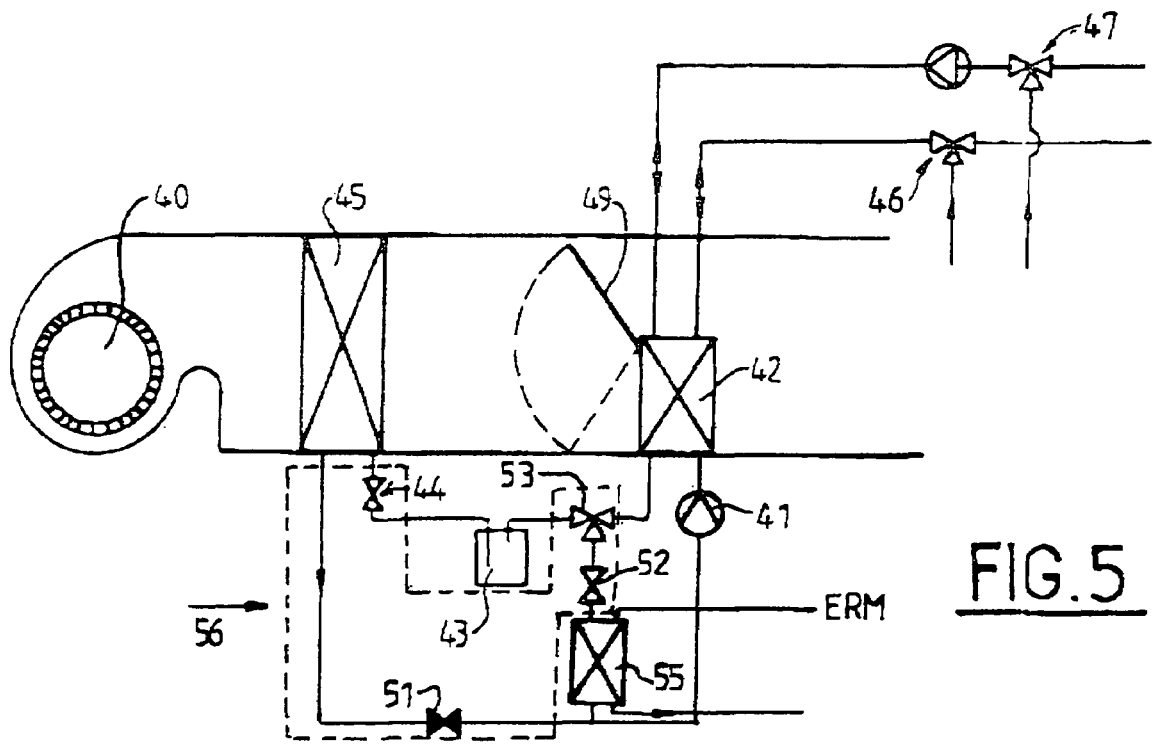

FIGS. 4 and 5 represent the loop of FIGS. 3 and 3b, to which is added an additional heating function, either in the form of a closed thermal loop (FIG. 4) or in the more elaborate form of a heat pump (FIG. 5). In either case, this means the use of an anti-return valve 51 and of a three-way valve 53 arranged between the exchanger 42 and the bottle 43 on the one hand, and of a tapping provided with a valve 52. As far as FIG. 4 (closed loop) is concerned, a pressure-reducing valve 4 may be arranged upstream or preferably downstream of the main exchanger 42 (or 7). In this latter case, a better thermal exchange is obtained within the exchanger 42, as the gases are hotter. Operation in heat-pump mode involves the use of an additional evaporator 55 arranged in the abovementioned tapping branch in series with the valve 52, as represented in FIG. 5. These two embodiments take advantage of the existence of the exchanger 42 which, because of its design, withstands the high pressures and is arranged within the passenger compartment.

In fact, a conventional heat-pump system cannot use a conventional evaporator as the latter is not designed to cope with pressures as high as those which are established in heating mode.

It is for this reason that, conventionally, heat pumps are constructed with more robust, and therefore more expensive, evaporators, or else with a second exchanger in the passenger compartment, which serves solely for heating mode and which is constructed with the same technologies as the condenser. Given that a heat pump makes it necessary to have available an exchanger which draws energy from a hot source, a preferential embodiment of this exchanger is the use, as represented in FIG. 5, of a water/refrigerantfluid exchanger 55 which serves as an evaporator in heating mode of the heat pump and which is traveised by cooling water, for example the cooling water from the engine ERM, which makes it possible to increase the quantity of heat available in the passenger compartment by drawing heat energy from the engine-cooling water.

As will be seen in the rest of the description, this exchanger can be integrated into the exchanger 42.

In air-conditioning mode, the three-way valve 53 directs the refrigerant fluid leaving the condenser 42 towards the bottle 43 of the pressure-reducing valve 44, the evaporator 45 and the return to the compressor 41. In heating mode, the three-way valve 53 directs the refrigerant fluid leaving the exchanger 42 to the tapping 52 and thus in the case of FIG. 5 through the additional evaporator 55.

The operation of the circuit of FIG. 4 is very simple. The compressor 41 supplies the exchanger 42 and the fluid at the outlet from it is re-injected into the inlet of the compressor 41. This is a case of thermal heating in which the energy supplied by the exchanger 42 is equal (to within the losses) to the mechanical work by the compressor 41.

As FIG. 6a shows, the exchanger 9 has a main exchanger 7, consisting of a stack of elements 5 or 5' for exchanging between the water and the refrigerant fluid, and of elements 4 for exchanging with the air. This main exchanger can be used as an exchanger 42 in the examples described. It preferably includes an additional exchanger 8 which consists of a stack of elements 5 and 5', for example, without elements 4 being interposed. This auxiliary exchanger 8 can be used in particular as an evaporator 55 for heating by heat pump as represented in FIG. 5. It can also be used as an exchanger for sub-cooling of the refrigerant fluid of the main loop. This makes it possible to obtain a refrigerant fluid said to be overcooled to a temperature lower by about 5° C. to 10° C. than its condensation temperature. This makes it possible to optimise the performance of the condenser placed downstream of the additional exchanger 8. The refrigerant-fluid collector 72 exhibits a tubular part provided with a separation 76 so as to separate the fluid which arrives, for example, via a lower inlet duct 74 and leaves again via an outlet duct 73 (FIGS. 6b and 6c). Moreover, and as represented in FIGS. 6c and 6d, the refrigerant-fluid collector 72 is preferably equipped with a cylindrical reservoir 77 which forms a bottle for refrigerant fluid. This bottle is advantageously made of extruded metal, this extrusion possibly being carried out at the same time as that of the collector, or else the extruded bottle is fixed onto the collector by brazing. It will be noted that, by reason of the compactness of the installation due to the shortening of the links between components, as well as to the better leaktightness, or even the total leaktightness which is obtained, the volume of this bottle can be considerably reduced by comparison with the one that is necessary in a conventional installation.

FIG. 7a shows a routing valve 79 which is a three-way valve which makes it possible to route the intake of the refrigerant fluid toward the main exchanger 7 and/or the auxiliary exchanger 8.

FIG. 7b shows in more detail an embodiment of the refrigerant-fluid collector 72, to which is fastened the bottle 77 in the case in which the refrigerant fluid exits via the bottle 77. The refrigerant fluid enters at 92 through the top of the collector 72, and runs through the main exchanger 7, and it then enters the bottle 77 via an aperture 93 situated at the lower part of the collector 72. An aperture 94, called outgassing aperture, is placed in the upper part of the collector 72 in order to facilitate gas/liquid separation in the collector 72. This aperture 94 opens out into the upper part of the bottle 77. The refrigerant fluid is taken up at the lower part 95 of the bottle 75 in order to be overcooled in the auxiliary exchanger 8. Next, the overcooled refrigerant fluid can be directed to the pressure-reducing valve 44 and the evaporator 45, for example, either directly or, as represented, by passing back through a sub-compartment 77' of the bottle.

Figure 8:
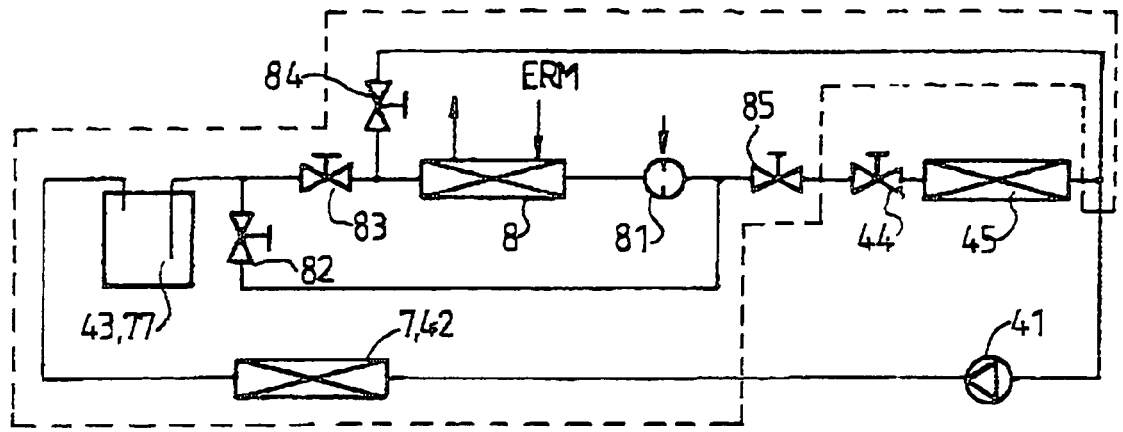
FIG. 8 represents a thermal loop, according to the invention, having an auxiliary exchanger.

FIG. 8 illustrates the use of the auxiliary exchanger 8 especially as a water/refrigerant-fluid evaporator in heat-pump mode. In this mode of operation, the condenser of the heat pump consists of the main exchanger 7, and the additional exchanger 8 is fed via a pressure-reducing valve 81. The set of connections is determined by valves 82, 83, 84 and 85. In air-conditioning mode, the main exchanger 7 fulfils the function of the condenser 42, the valves 82 and 85 are open and the valves 83, 84 are closed. In heat-pump mode, the valves 83, 85 are closed and the valves 82, 84 are open. In sub-cooling mode, the valves 82 and 84 are closed and the valves 83 and 85 are open. The refrigerant fluid which leaves the bottle 43 (or 77) is overcooled in the auxiliary exchanger 8 before passing through the evaporator 45 of the air-conditioning loop.

Figure 9:
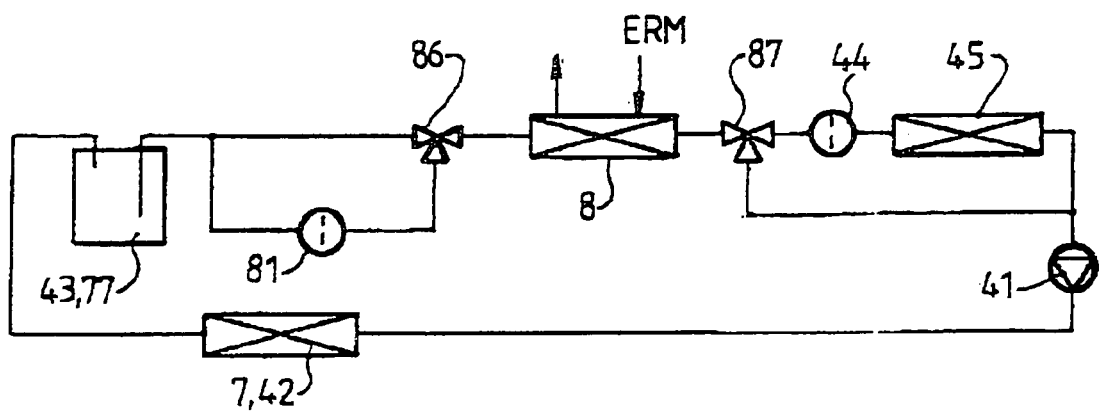
FIG. 9 represents a thermal loop, according to the invention, showing a circuit with two 3-way valves.

Another circuit which employs two 3-way valves 86 and 87 is represented in FIG. 9. In airconditioning mode with sub-cooling of the refrigerant fluid, the three-way valves 86 and 87 are open (in direct mode), that is to say that the refrigerant fluid at the outlet of the condenser 42 passes through the bottle 43 (or 77), then the auxiliary exchanger 8, the pressure-reducing valve 44 and finally the evaporator 45 before returning to the compressor 41. In this mode, the heat-carrying fluid which passes through the auxiliary exchanger 8 is preferably the overcooled water ESR, which can equally be the engine-cooling water ERM.

In the mode of heating of the passenger compartment by heat pump, the valve 86 directs the refrigerant fluid through the pressure-reducing valve 81. The refrigerant fluid next passes through the auxiliary exchanger 8 which performs the function of evaporator for the heat pump, then returns to the inlet of the compressor 41, the valve 87 tapping off the refrigerant fluid in this direction.

The auxiliary exchanger 8 is traversed by a heat-carrying fluid, for example the engine-cooling water ERM, which gives up its heat energy to the refrigerant fluid.

The heating/air-conditioning installation according to the invention can be integrated into the driver's position of a motor vehicle.

What is claimed is:

1. A heating/air-conditioning installation for a motor vehicle, the installation comprising a thermal loop which includes a refrigerating compressor, a condenser, a pressure-reducing valve, an evaporator and a heating element;
    the condenser and the heating element are interconnected together into a main fluid-carrying heat exchanger provided to simultaneously carry both a heat-carrying fluid and a refrigerant fluid;
    the main fluid-carrying heat exchanger includes at least one first circulation element carrying the heat-carrying fluid and at least one second circulation element carrying the refrigerant fluid;
    the at least one first circulation element has a first longitudinal axis; and
    the at least one second circulation element has a second longitudinal axis;
    wherein the first longitudinal axis is substantially parallel to the second longitudinal axis and wherein the at least one first circulation element at least partially circumscribes the at least one second circulation element so that the at least one first circulation element is in contact with the at least one second circulation element.

2. The installation of claim 1, the main fluid-carrying heat exchanger further comprises:
    at least one surface for exchanging heat between air and the heat-carrying fluid flowing through the main fluid-carrying heat exchanger, and
    at least one surface for exchanging heat between the heat-carrying fluid and the refrigerant fluid flowing through the main heat-carrying fluid exchanger.

3. The installation of claim 1, the main fluid-carrying heat exchanger further comprises:
    at least one surface for exchanging heat between air and the refrigerant fluid, and
    at least one surface for exchanging heat between the heat-carrying fluid and the refrigerant fluid.

4. The installation of claim 1, wherein the main fluid-carrying heat exchanger includes a single first collector of the heat-carrying fluid and a single second collector of the refrigerant fluid, the first and second single collectors being arranged at opposite ends of the main fluid-carrying heat exchanger.

5. The installation of claim 4, wherein the main fluid-carrying heat exchanger within the thermal loop exchanges heat between the heat-carrying fluid and the refrigerant fluid, wherein the at least one first circulation element of the main fluid-carrying heat exchanger is provided for circulating the heat-carrying fluid along an outwards and return path from and to the first collector and the at least one second circulation element is provided for circulating the refrigerant fluid along an outwards and return path from and to the second collector.

6. The installation of claim 5, wherein circulation of the refrigerant fluid and circulation of the heat-carrying fluid currents take place along U-shaped paths inside the main fluid-carrying heat exchanger and arranged so that the refrigerant fluid and the heat-carrying fluid circulate counter to each other.

7. The installation of claim 1, wherein the thermal loop further comprises an additional evaporator for operation in a heating mode and a routing circuit defining a heat pump in the heating mode, the heat pump utilizing the condenser of the main fluid-carrying heat exchanger and the additional evaporator as an apparatus for converting the refrigerant fluid into vapor.

8. The installation of claim 1, wherein the thermal loop further comprises a second routing circuit forming a heating loop in a thermal heating mode, the heating loop including the compressor and the main fluid-carrying heat exchanger, a refrigerant-fluid outlet of the main fluid-carrying heat exchanger being coupled to an inlet of the compressor.

9. The installation of claim 8, further comprising a second pressure-reducing valve arranged downstream of the main fluid-carrying heat exchanger.

10. The installation of claim 1, wherein the heat-carrying fluid is in the form of one of cooling water and overcooled water and wherein the thermal loop includes a supply device for supplying the main fluid-carrying heat exchanger with one of the cooling water and the overcooled water as the heat-carrying fluid.

11. The installation of claim 10, further comprising:
    an air-conditioning mode in which the main fluid-carrying heat exchanger is traversed by the refrigerant fluid and by the heat-carrying fluid, and
    a heating mode in which the main fluid-carrying heat exchanger is traversed by the heat-carrying fluid.

12. The installation of claim 11, further comprising a mixing flap that controls flow of air passing through the main fluid-carrying heat exchanger, in the air-conditioning mode the mixing flap is in a closed position in which airflow through the main fluid-carrying heat exchanger is restricted.

13. The installation of claim 12, further comprising a de-misting mode in which the air-conditioning mode is activated, and in which the mixing flap is in an at least partially open position, so that the main exchanger is traversed by at least a part of the airflow.

14. The installation of claim 1, wherein the second circulation element is disposed adjacent to and abutting the first circulation element.

15. The installation of claim 14, further comprising a heat dissipating fin adjacent the first circulation element.

16. A heating/air-conditioning installation for a motor vehicle, the installation comprising a thermal loop which includes a refrigerating compressor, a condenser, a pressure-reducing valve, an evaporator and a heating element;
- the condenser and the heating element are interconnected together into a main fluid-carrying heat exchanger provided to simultaneously carry both a heat-carrying fluid and a refrigerant fluid;
- the main fluid-carrying heat exchanger includes at least one first circulation element carrying the heat-carrying fluid and at least one second circulation element carrying the refrigerant fluid;
- wherein the at least one first circulation element at least partially circumscribes the at least one second circulation element so that the at least one first circulation element is in contact with the at least one second circulation element, and
- wherein the main fluid-carrying heat exchanger includes a single first collector of the heat-carrying fluid and a single second collector of the refrigerant fluid, the first and second single collectors being arranged at opposite ends of the main fluid-carrying heat exchanger.

17. The installation of claim 16, wherein the main fluid-carrying heat exchanger within the thermal loop exchanges heat between the heat-carrying fluid and the refrigerant fluid, wherein the at least one first circulation element of the main fluid-carrying heat exchanger is provided for circulating the heat-carrying fluid along an outwards and return path from and to the first collector and the at least one second circulation element is provided for circulating the refrigerant fluid along an outwards and return path from and to the second collector.

18. The installation of claim 17, wherein circulation of the refrigerant fluid and circulation of the heat-carrying fluid currents take place along U-shaped paths inside the main fluid-carrying heat exchanger and arranged so that the refrigerant fluid and the heat-carrying fluid circulate counter to each other.

19. A heating/air-conditioning installation for a motor vehicle, the installation comprising a thermal loop which includes a refrigerating compressor, a condenser, a pressure-reducing valve, an evaporator and a heating element;
- the condenser and the heating element are interconnected together into a main fluid-carrying heat exchanger provided to simultaneously carry both a heat-carrying fluid and a refrigerant fluid;
- the thermal loop further comprises an additional evaporator for operation in a heating mode and a routing circuit defining a heat pump in the heating mode, the heat pump utilizing the condenser of the main fluid-carrying heat exchanger and the additional evaporator as an apparatus for converting the refrigerant fluid into vapor;
- the main fluid-carrying heat exchanger includes at least one first circulation element carrying the heat-carrying fluid and at least one second circulation element carrying the refrigerant fluid;
- wherein the at least one first circulation element at least partially circumscribes the at least one second circulation element so that the at least one first circulation element is in contact with the at least one second circulation element.

\* \* \* \* \*